(12) United States Patent
Kamimura et al.

(10) Patent No.: US 7,357,195 B2
(45) Date of Patent: Apr. 15, 2008

(54) POWER TOOL AND GEAR UNIT ASSEMBLED THEREIN

(75) Inventors: Junichi Kamimura, Hitachinaka (JP); Hiroto Inagawa, Hitachinaka (JP); Kenichirou Yoshida, Hitachinaka (JP); Takashi Kawamata, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/100,441

(22) Filed: Apr. 7, 2005

(65) Prior Publication Data

US 2005/0224245 A1    Oct. 13, 2005

(30) Foreign Application Priority Data

Apr. 12, 2004    (JP) ............... P2004-116451

(51) Int. Cl.
*E21B 4/04*    (2006.01)

(52) U.S. Cl. .............. 173/216; 173/210; 173/211; 74/411

(58) Field of Classification Search ............... 173/216, 173/213, 210, 211; 464/74, 76, 51, 160, 464/180, 185; 74/411, 443, 440, 362, 366, 74/374

See application file for complete search history.

(56) References Cited

U.S. PATENT DOCUMENTS

| | | | | |
|---|---|---|---|---|
| 2,961,586 A | * | 11/1960 | Morrell et al. ............ | 318/611 |
| 3,293,883 A | * | 12/1966 | Boschi et al. ............. | 464/74 |
| 3,345,831 A | * | 10/1967 | Boole ....................... | 464/74 |
| 3,540,233 A | * | 11/1970 | Pearson ..................... | 464/74 |
| 4,355,990 A | * | 10/1982 | Duncan, Jr. ................ | 474/94 |
| 4,424,046 A | * | 1/1984 | Ziegler ..................... | 464/74 |
| 4,486,183 A | * | 12/1984 | Posiviata et al. .......... | 474/94 |
| 4,585,078 A | * | 4/1986 | Alexandrov et al. ....... | 173/93.5 |
| 4,779,470 A | * | 10/1988 | Morita et al. .............. | 74/7 R |
| 4,795,402 A | | 1/1989 | Reichardt | |
| 4,838,107 A | * | 6/1989 | Herrmann .................. | 74/411 |
| 5,113,713 A | * | 5/1992 | Isabelle et al. ............ | 74/410 |
| 5,873,786 A | * | 2/1999 | Hosoya et al. ............. | 464/73 |
| 5,924,928 A | * | 7/1999 | Stegman et al. ........... | 464/73 |
| 6,045,448 A | * | 4/2000 | Kern et al. ................ | 464/74 |
| 6,131,477 A | * | 10/2000 | Gaydek et al. ............. | 74/411 |
| 6,149,176 A | * | 11/2000 | Fujii ......................... | 280/284 |

(Continued)

FOREIGN PATENT DOCUMENTS

DE    3922552 A1 *    1/1991

(Continued)

*Primary Examiner*—Rinaldi I. Rada
*Assistant Examiner*—Michelle Lopez
(74) *Attorney, Agent, or Firm*—Antonelli, Terry, Stout & Kraus, LLP.

(57) ABSTRACT

A power tool including a gear unit provided with a load moderating mechanism capable of reducing noise and prolonging service life. A coupling is force fitted with a spindle at a predetermined pressure allowing the spindle and the coupling to rotate relative to each other when a load exceeding a predetermined load is applied therebetween. A gear has a surround section having a convex and surrounding the coupling. The coupling has an abutment projection abutable against the convex and a damper projection. An elastic member is interposed between the damper projection and the surround section. Rotation of the gear is transmitted to the spindle through the elastic member and the coupling.

9 Claims, 8 Drawing Sheets

U.S. PATENT DOCUMENTS

| | | |
|---|---|---|
| 6,265,799 B1 * | 7/2001 | Uriarte ................ 310/103 |
| 6,295,910 B1 | 10/2001 | Childs |
| 6,619,410 B2 * | 9/2003 | Kamimura et al. ......... 173/216 |
| 6,863,135 B2 * | 3/2005 | Kamimura et al. ......... 173/216 |
| 7,048,075 B2 * | 5/2006 | Saito et al. ................ 173/93.5 |
| 2006/0191365 A1 * | 8/2006 | Stierle et al. ................ 74/411 |

FOREIGN PATENT DOCUMENTS

| | | |
|---|---|---|
| DE | 100 38 920 | 4/2001 |
| DE | 101 11 644 | 9/2002 |
| DE | 101 31 220 | 3/2003 |
| EP | 0 251 078 | 1/1988 |
| JP | 03-049883 | 3/1991 |

* cited by examiner

POWER TOOL AND GEAR UNIT ASSEMBLED THEREIN

BACKGROUND OF THE INVENTION

The present invention relates to a power tool and a gear unit assembled therein.

In a power tool, vibration force due to alternating current, pitch error and eccentricity of gears or the like cause rotational fluctuation. Due to the rotational fluctuation, the tooth surfaces of gears on the drive shaft side and driven shaft side repeatedly bump against each other, thereby causing noise. Further, the collision force between the tooth surfaces produces vibration force to generate noise at the portions other than gear parts. Particularly loud noise is generated due to large impact force, since large torque is provided at the drive shaft side at an initial start-up period.

To avoid the above-described problem, improvement on dimension accuracy of the gear or on a design in shape of the tooth surface have been proposed. Further, in order to structurally reduce the noise, a gap is positively provided between a steel key and an inner peripheral side of a drive gear, the steel key being interposed between the inner peripheral side of the drive gear and an outer peripheral side of a drive shaft for coupling together. However, the steel key may be deformed due to long-term use thereby generating larger gap, which may adversely lead to noise.

Laid open Japanese Patent Application publication No. H03-49883 discloses an elastic member adapted for power transmission and interposed between a drive gear and a drive shaft. However, the elastic member may be squashed and become ineffective when excessive load is applied between the drive shaft and drive gear.

SUMMARY OF THE INVENTION

It is therefore, an object of the present invention to provide a power tool and a gear unit capable of reducing noise caused by gears and alleviating excessive load to be applied to gears thereby prolonging service life.

This and other objects of the present invention will be attained by a power tool including a housing, a motor, a gear unit, and a rotary shaft. The motor is disposed in the housing and has a drive shaft. The gear unit is supported in the housing and is driven by the drive shaft. The rotary shaft is rotatably supported to the housing and is driven through the gear unit. The gear unit includes an intermediate member and a gear. The intermediate member is force-fitted with the rotary shaft at a predetermined force-fitting pressure. The predetermined force-fitting pressure allows the rotary shaft and the intermediate member to rotate relative to each other when a load exceeding a predetermined load is applied between the rotary shaft and the intermediate member. The intermediate member has an abutment projection. The gear is driven by the drive shaft and is disposed concentrically with the rotary shaft and has a surround portion surrounding the intermediate member and provided with a convex portion. The surround portion is drivingly connected to the intermediate member to rotate the rotary shaft. The abutment projection is abuttable against the convex portion when the rotary shaft and the gear are rotated relative to each other.

In another aspect of the invention, there is provided A gear unit that transmits rotation of a motor to a rotary shaft. The gear unit includes the intermediate member and the gear.

In still another aspect of the invention, there is provided a power tool including a housing, a motor, and a gear unit. The motor is disposed in the housing and has a drive shaft. The gear unit is supported in the housing and is driven by the drive shaft. The gear unit includes a rotary shaft, a gear, and an elastic member. The rotary shaft is rotatably supported to the housing and has a damper wall section crossing a rotating direction thereof. The gear is driven by the drive shaft and is disposed concentrically with the rotary shaft and has a surround portion surrounding the damper wall section. The elastic member is disposed within the surround portion and is interposed between the damper wall section and the surround portion to drivingly connect the gear to the rotary shaft. The elastic member has a plurality of regions in contact with the damper wall and the surround portion. Each region is configured into an arcuate shape.

DETAILED DESCRIPTION OF THE PREFERRED EMBODIMENTS

Figure 1:
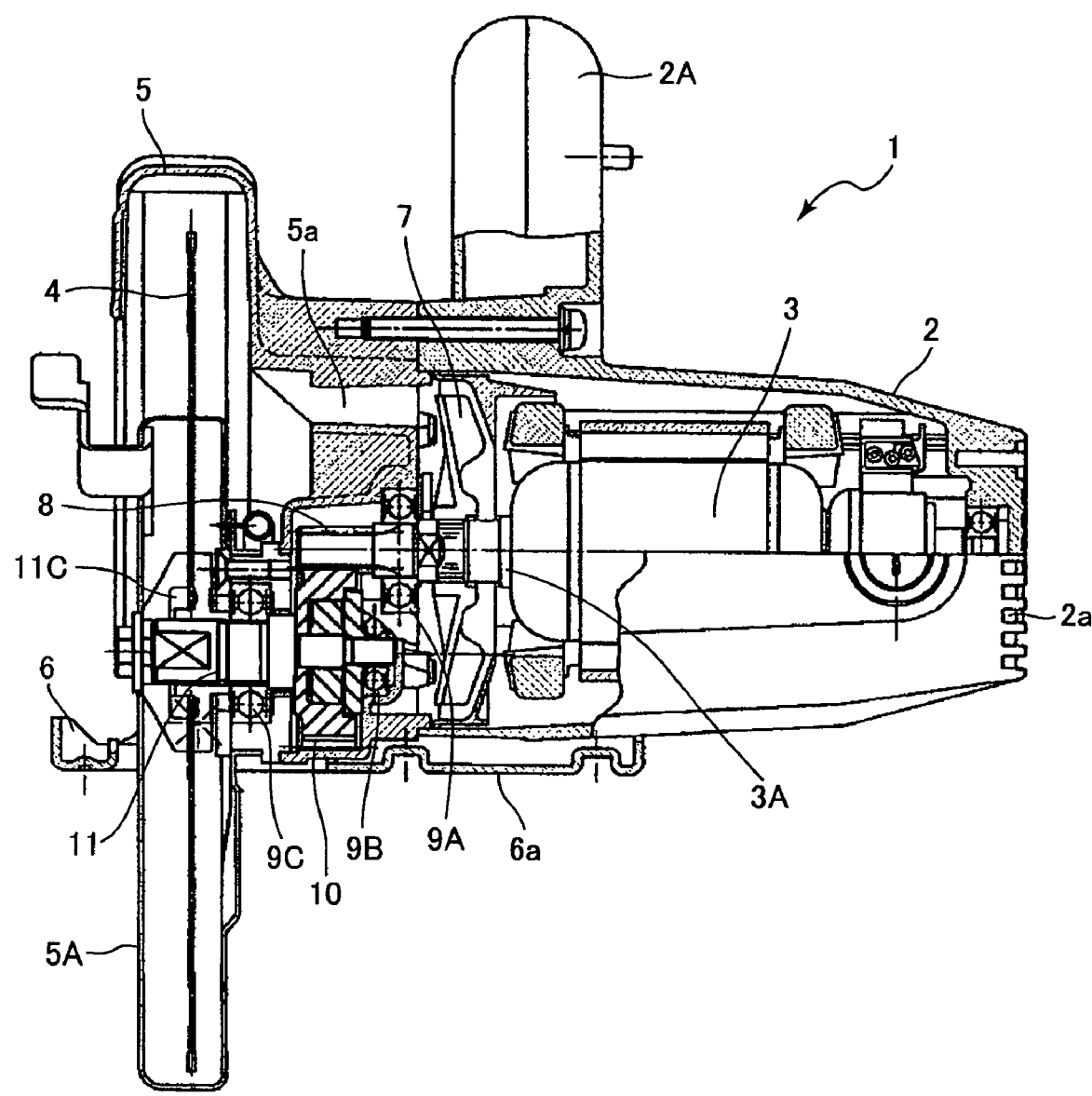
FIG. 1 is a cross-sectional side view of a portable circular saw embodying a power tool according to a first embodiment of the present invention.

A power tool according to a first embodiment of the present invention will be described with reference to FIGS. 1 through 5. The first embodiment pertains to a portable electric circular saw. The circular saw 1 generally includes a housing 2, a motor 3, a handle 2A, a saw blade 4, a saw cover 5, a base 6, and a fan 7. An air inlet 2a is formed at one end of the housing 2 to allow the inside and outside of the housing 2 to communicate with each other. The handle 2A has a hollow portion (not shown) integrally coupled to the housing 2. The handle 2A has a switch (not shown) for controlling the motor 3. The motor 3 is supported in the housing 2 and has a drive shaft 3A for driving the fan 7 and the saw blade 4. The saw blade 4 is concentrically attached to a spindle 11 (described later) and is rotatable only in a cutting direction (forward direction). The saw cover 5 is fitted to the housing 2 and has a shape that covers the upper half of an outer circumference of the saw blade 4. An outlet 5a is formed in the saw cover 5 for discharging air flowing from the fan 7. The base 6 is coupled to the housing 2 through the saw cover 5 and has a bottom surface 6a that can slidably move on a workpiece to be cut out. Further, an opening portion (not shown) is formed on the base 6 for allowing the saw blade 4 to protrude downward from the bottom surface 6a. The fan 7 is concentrically fixed to the drive shaft 3A of the motor 3. The rotation of the fan 7 generates positive air-flow to cool the motor 3.

A pinion gear 8, which is a helical gear, is fixedly provided at one end of the drive shaft 3A. The drive shaft 3A and pinion gear 8 are rotatably supported to the housing 2 and the saw cover 5 through a bearing at the air inlet 2a side of the housing 2 and a first shaft bearing 9A provided at the saw cover 5, respectively. The spindle 11 extending in parallel with the drive shaft 3A is rotatably supported to the saw cover 5 through a second shaft bearing 9B and third shaft bearing 9C. The spindle 11 serves as a rotary shaft for rotating the saw blade 4. A gear 10, which is a helical gear to be meshingly engaged with the pinion gear 8, is disposed concentrically with the spindle 11 at the side of the housing 2. A pair of saw blade fixing members 11C are fitted to the spindle 11 so as not be rotatable relative to the spindle 11. The saw blade 4 is fixedly held between the saw blade fixing members 11C.

A safety cover 5A is movably supported to the saw cover 5 so as to be pivotable about an axis of the spindle 11, so that the safety cover 5A is retractable into the saw cover 5. The safety cover 5A has a shape that covers substantially the remaining half of the outer circumference of the saw blade 4. A biasing member (not shown) such as a spring is provided for normally protruding the safety cover 5A out of the saw cover 5 as shown in FIG. 1 in order to normally prevent the remaining half outer circumference of the saw blade 4 from being exposed to an atmosphere. During cutting, a leading edge portion of the safety cover 5A (the leading edge portion being on the front side in the cutting direction) comes into contact with an end face of the workpiece to be cut out. In this state, when the electric circular saw 1 is slidably moved in the cutting direction onto the workpiece, the safety cover 5A is pivotally moved about the axis of the spindle 11 against the biasing force of the spring and is housed within the saw cover 5, exposing the saw blade 4 to the atmosphere at the bottom surface 6a of the base 6.

Figure 2:
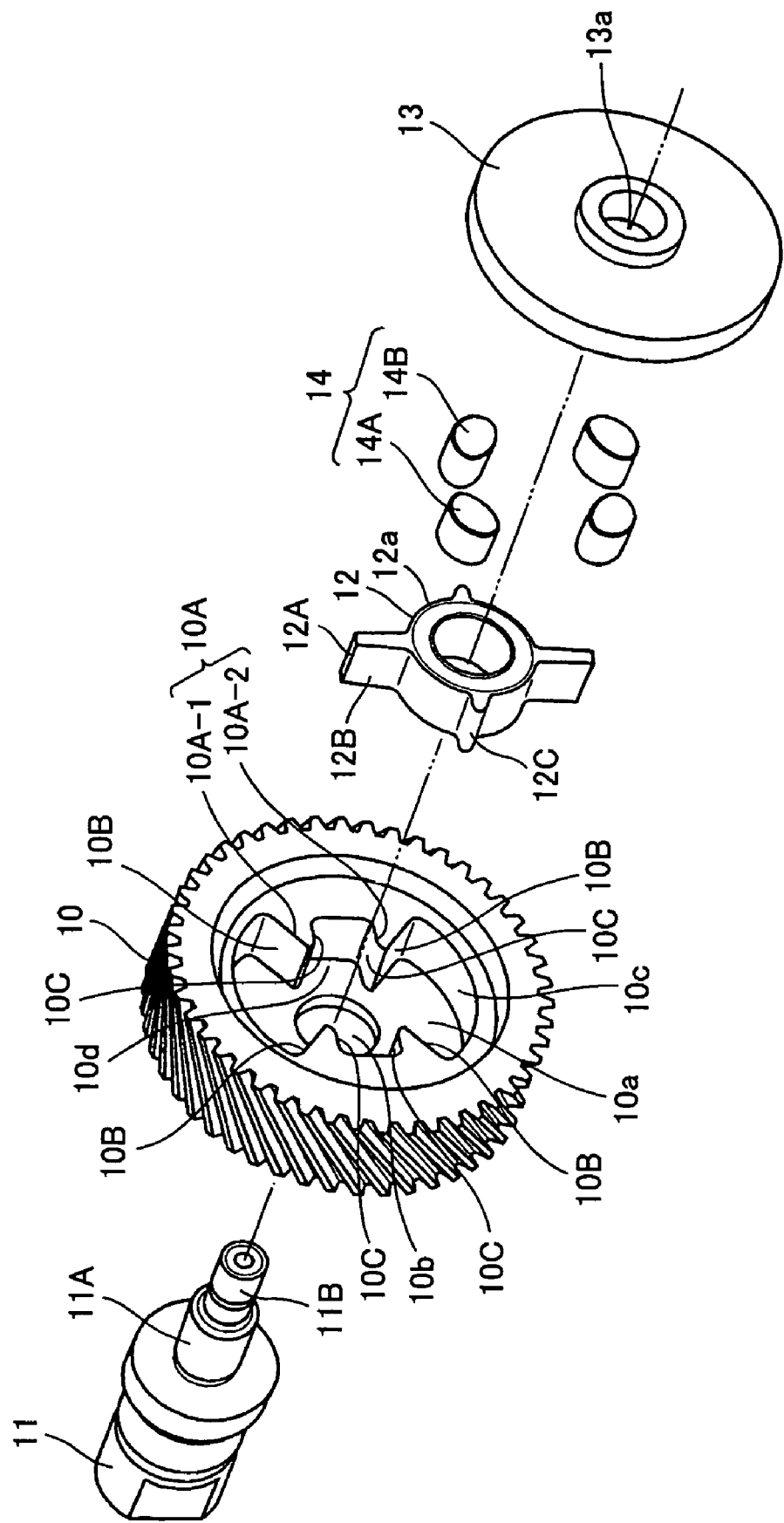
FIG. 2 is an exploded perspective view showing a gear unit employed in the power tool according to the first embodiment.

A gear unit and the spindle 11 are shown in FIG. 2. A concave portion 10a is formed on one side surface of the gear 10. The concave portion 10a has a depth extending in an axial direction of the gear 10 and has an inner peripheral surface and a bottom wall. A center hole 10b is formed at the bottom wall. A radially inwardly protruding portion or convex portion 10A extends from the inner peripheral surface of the concave portion 10a. The radially inwardly protruding portion 10A includes a first pair of convex 10A-1 and a second pair of convex 10A-2 spaced away from each other in the circumferential direction providing a pair of gap 10d and a pair of space 10c therebetween. Further, The first pair of convex 10A-1 are arrayed at diametrically opposite sides, and the second pair of convex 10A-2 are arrayed at diametrically opposite sides. The first and second pair of convex 10A-1, 10A-2 have damper contact surfaces 10B, 10B defining therebetween the pair of space 10c, and abutment surfaces 10C, 10C defining therebetween the pair of gap 10d.

The spindle 11 has a first shaft section 11A and a distal end second shaft section 11B whose diameter is smaller than that of the first shaft section 11A. The first shaft section 11A is inserted through the center hole 10b. The inner diameter of the center hole 10b is slightly greater than the outer diameter of the first shaft section 11A.

A coupling 12, serving as an intermediate member, is positioned in the concave portion 10a and is force-fitted with the first shaft section 11A that projects into the concave portion 10a through the center hole 10a. The coupling 12 includes a base sleeve section, a pair of damper projections 12A, and a pair of abutment projections 12C. The base sleeve section is formed with a bore 12a to be fitted with the first shaft section 11A. The pair of damper projections 12A protrude radially outwardly from the base sleeve section and are arrayed diametrically opposite sides thereof. Each damper projection 12A is positioned within each space 10c, and has a damper contact surfaces 12B.

The pair of abutment projections 12C protrude radially outwardly from the base sleeve section and are arrayed diametrically opposite sides thereof. The projections 12B and 12C are positioned in a cruciform fashion in combination. Each abutment projection 12C is positioned within each gap 10d, and abutable onto the convex portion 10A. Thus, each abutment projection 12C is movable within the gap 10d, so that the relative angular rotational movement between the coupling 12 and the gear 10 can be performed within the circumferential length of the gap 10d.

The hole 12a of the coupling 12 has a predetermined fitting tolerance (0.017 mm to 0.039 mm) relative to the outer diameter of the first shaft section 11A. Polishing is effected to the outer surface of the first shaft section 11A and the inner surface of the holes 12a before force fitting. Thus, sufficient force fitting results to fit the hole 12a with the first shaft section 11A, when an adequate load consistent with the predetermined fitting tolerance is applied to the coupling 12. At this time, the shaft torque needed to cause the slippage at the force-fitted portion is 30 Nm to 50 Nm, which is more than double the maximum shaft torque (about 15 Nm) generated by the motor 3. Note that the above values of the fitting tolerance and shaft torque are merely an example and are appropriately set in accordance with the size of the saw blade 4 and the performance of the motor.

Figure 3:
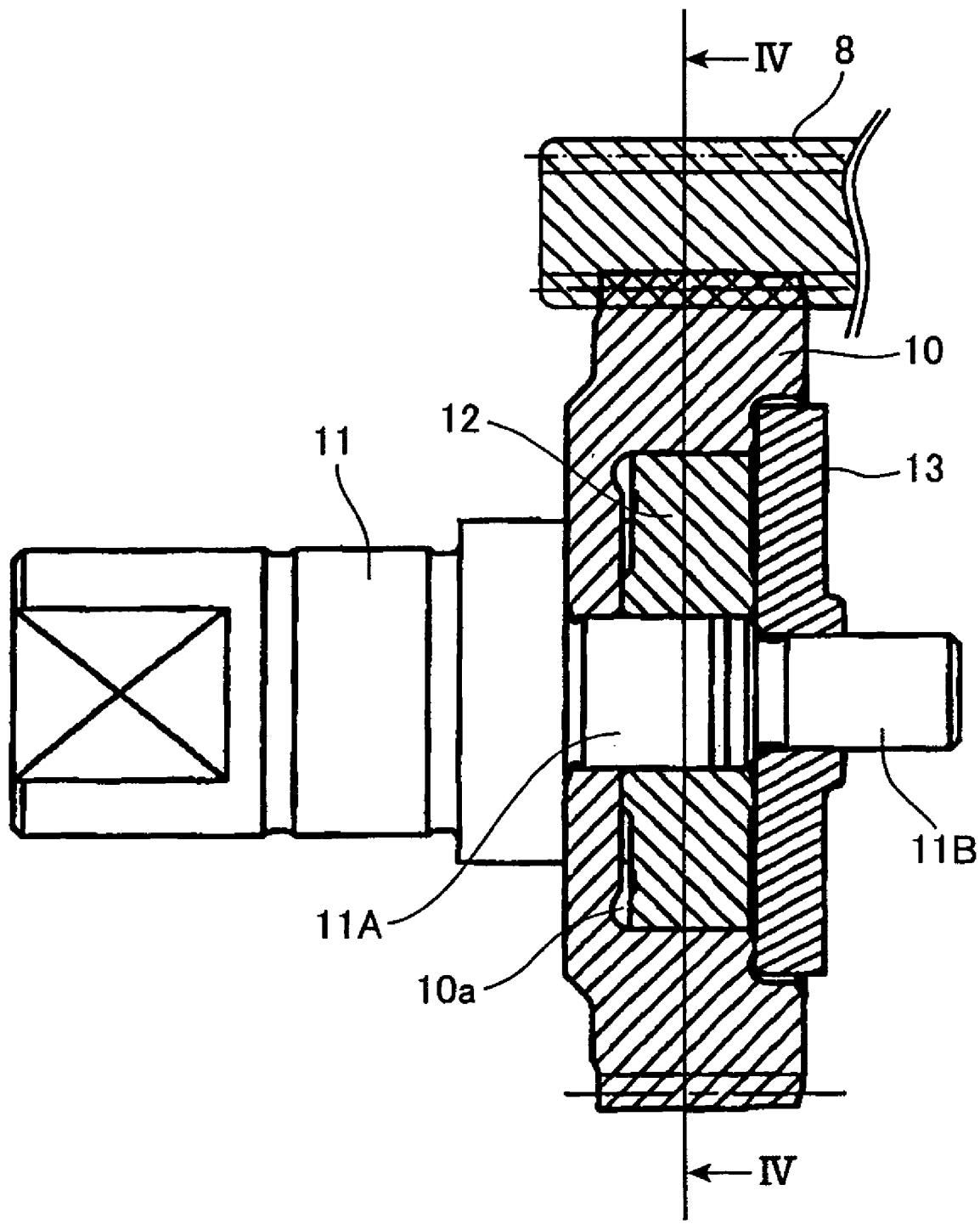
FIG. 3 is an partially enlarged cross-sectional side view showing the gear unit according to the first embodiment.

Thus, the gear 10 is held at the proximal end of the first shaft section 11A by the spindle 11 and coupling 12 as shown in FIG. 3. Incidentally, the coupling 12 is not pressed to a position to tightly nip the bottom wall between the spindle 11 and the coupling 12 when the coupling 12 is force-fitted with the first shaft section 11A. Therefore, relative angular rotation is attainable between the gear 10 and spindle 11.

Figure 4:
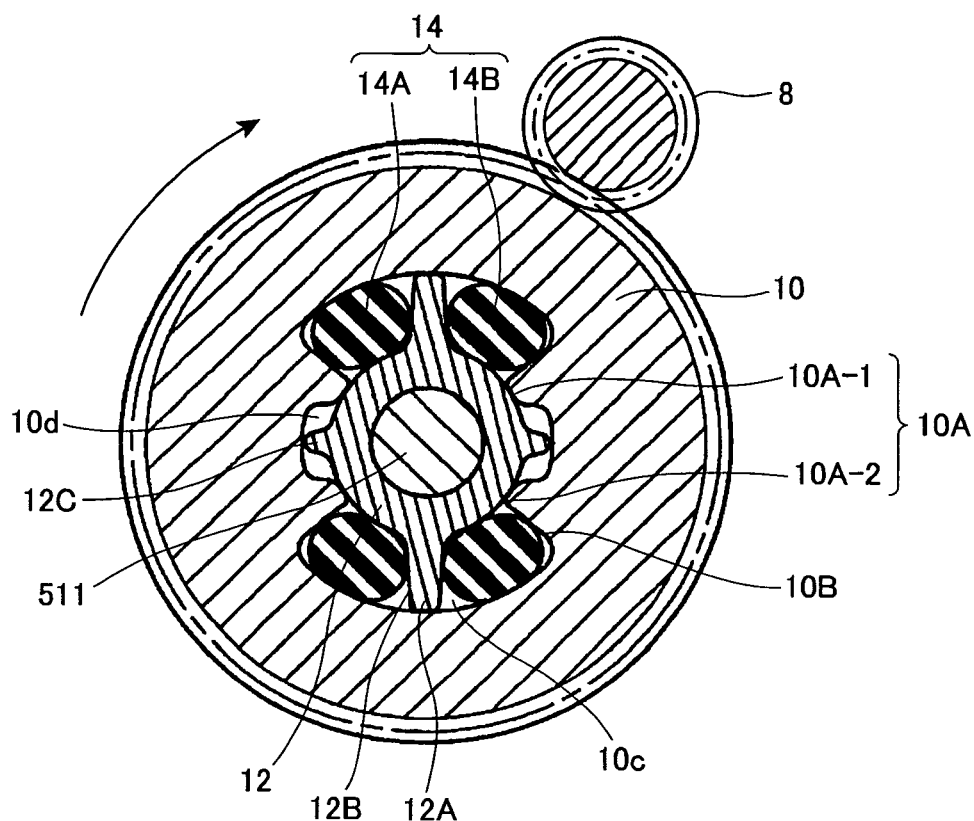
FIG. 4 is a cross-sectional view taken along the line IV-IV of FIG. 3.

After the coupling 12 has been force-fitted to the gear 10, elastic members 14 are disposed in the spaces 10c as shown in FIG. 4. The elastic member 14 is made from rubber having heat resistance and oil resistance. The elastic member 14 has substantially an ellipsoid cross-section. Each of one set of the elastic members 14B is interposed between the damper contact surface 10B of the first convex 10A-1 and the damper contact surface 12B of the damper projection 12A, and each of another set of the elastic members 14A is interposed between the damper contact surface 10B of the second convex 10A-2 and the damper contact surface 12B of the damper projection 12A.

In other words, the damper projection 12A is sandwiched between the elastic members 14A and 14B in the space 10c, so that the damper projection 12A is positioned at substantially the center of the space 10c. Further, the abutment projection 12C is positioned at substantially the center of the gap 10d as shown in FIG. 4, with the result that a gap still remains between the projection 12C and the convex portion 10A. Therefore, the abutment projection 12C does not abut the convex portion 10A at all as long as no load is applied to the gear unit.

The elastic members 14 have substantially the same shape. As shown in FIG. 4, when assembling the elastic members 14 into the spaces 10c, symmetrical configuration results with respect to a diametrical line extending between the damper projections 12A, 12A, and with respect to another diametrical line extending between the abutment projections 12C and 12C. After the assembly of the elastic members 14 into the spaces 10c, the elastic member 14 contacts not only the damper contact surfaces 10B and 12B but also the outer circumferential surface of the base sleeve section of the coupling 12. Thus, each elastic member 14 is compressed and held between the coupling 12 and the concave portion 10a of the gear 10. Since the shapes of the concave portion 10a, coupling 12, and spindle 11 are symmetric with respect to the diametrical lines, and since all elastic members 14 have identical shapes, the coupling 12, the spindle 11, and gear 10 can be concentrically aligned with one another as long as the elastic members 14 are compressedly held in the spaces 10c.

Further, since the elastic member 14 is compressedly interposed between the concave portion 10a and the coupling 12, a concentric arrangement can be maintained between a rotation axis of the gear 10 and a rotation axis of the spindle 11, thereby performing a smooth rotation without any vibration.

A washer 13 is disposed at an open end of the concave portion 10a in order to retain the elastic members 14 within the concave portion 10a. The washer 13 is formed with a center hole 13a through which the second shaft section 11B extends. In a state where the elastic members 14 are assembled, the washer 13 is force-fitted to the second shaft section 11B. The hole 13a also has a predetermined fitting tolerance relative to the second shaft section 11B. Thus, when the washer 13 and the second shaft section 11B are force-fitted to each other at the hole 13a, the washer 13 is tightly fixed to the spindle 11. With this structure, the spindle 11 and gear 10 are integrally rotatable.

In operation, when a worker turns ON a switch (not shown) on the circular saw 1, the motor 3 starts to rotate. This rotation is transmitted to the pinion gear 8 and gear 10 to ultimately rotate the circular saw blade 4 held and fixed by the spindle 11 connected to the gear 10. Since the gear 10 and spindle 11 are coaxial with each other, vibration between the spindle 11 and gear 10 due to offsetting relationship therebetween can be prevented.

At this time, the gear 10 rotates clockwise as shown in FIG. 4. Since the circular saw blade 4 is in a stationary state at the very timing when the switch is turned on, the spindle 11 to which the circular saw blade 4 is fixed and the coupling 12 with which the spindle 11 is force-fitted are maintained in their current stationary positions due to the law of inertia, and are urged to be rotated relative to the gear 10 in a counterclockwise direction. However, since the elastic member 14A is interposed between the damper contact surface 10B of the convex portion 10A and the damper contact surface 12B of the damper projection 12A, the elastic member 14A is compressed between the damper projection 12A and the second pair of convex 10-B and prevents the gear 10 from direct abutment with the coupling 12. Thus, the circular saw blade 4 starts rotating smoothly at low noise.

A comparison is made with respect to a noise at the start-up time between an electric circular saw according to the first embodiment and the conventional circular saw. Noise at the start-up time in the conventional circular saw was 92 dB on average. On the other hand, noise at the start-up time in the circular saw 1 according to the first embodiment was 85 dB. That is, reduction in a noise level of 7 dB can be realized.

When the circular saw 1 starts to cut out a workpiece such as a wood plate, load is applied to the circular saw blade 4. The load level is dependent on the quality of a material or a thickness of the workpiece, or the like. Further, the load level is not always constant but may be fluctuated dependent on the region to be cut. This fluctuation of the load causes the spindle 11 and coupling 12 to rotate relative to the gear 10 in the clockwise direction or counterclockwise direction. However, the force generated by the fluctuation can be absorbed in the elastic members 14A, 14B interposed between the coupling 12 and gear 10. Therefore, load fluctuation does not affect the rotation of the gear 10. Consequently, disadvantageous wobbling between the gear 10 and the pinion gear 8 does not occur, thereby obviating noise and deformation.

Even during the normal rotation period in which no load is generated, the number of rotations of the gear 10 slightly fluctuates due to vibration caused by alternating current, pitch error between the gear 10 and the pinion gear 8, eccentricity, or the like. However, the force generated by the fluctuation is also absorbed in the elastic members 14 interposed between the coupling 12 and gear 10. Therefore, transmission of the generated force to the spindle 11 and coupling 12 does not occur. As a result, the spindle 11 and the coupling 12 perform steady rotation with the circular saw blade 4 serving as a flywheel. This can avoid vibration of the circular saw blade 4 and thereby restraining the noise caused by the vibration. In some cases, an impact may be generated due to slight difference in the number of rotations between the coupling 12 and gear 10. However, the impact can be absorbed in the elastic members 14, so that the impact that brings discomfort to a user can be reduced in the normal rotation period.

For stopping the operation of the circular saw 1, the switch is turned off when the user releases his or her hand from the switch, and an electromagnetic brake is applied to the motor 3. This electromagnetic brake imparts load onto the pinion gear 8, so that the gear 10 stops its rotation quickly. However, the inertial force of the circular saw blade 4 causes the spindle 11 and coupling 12 to rotate relative to the gear 10 in the clockwise direction. However, direct abutment between the coupling 12 and gear 10 can be prevented, since the elastic member 14B is interposed between the damper projection 12A and the first pair of convex 10A-1. Thus, the circular saw blade 4 stops rotation smoothly without generating an impact or the like.

There may be a case where the rotation of the saw blade 4 is unintentionally stopped instantaneously. Such case happens if the circular saw blade 4 is tightly nipped in the workpiece to be cut out during cutting operation, or if the workpiece to be cut out has a locally high hardness region. In such cases, the circular saw blade 4 and the spindle 11 stops rotation, whereas the pinion gear 8 and gear 10 are urged to be rotated since the pinion gear 8 is coupled to the motor 3. At this time, the elastic members 14 interposed between the coupling 12 and gear 10 are compressed by the urging force from the convex portion 10A. If excessive pressure is applied to the elastic members 14, the elastic members 14 are subjected to plastic deformation and lose their elasticity. In order to avoid the plastic deformation, the relative rotation between the coupling 12 and the gear 10 can be limited within a given angular rotation angle by the abutment between the abutment projection 12C of the coupling 12 and the convex portion 10A. Thus, excessive deformation of the elastic members 14 is avoidable.

More specifically, when the convex portion 10A of the gear 10 is brought into abutment with the abutment projection 12C of the coupling 12, the coupling 12 prevents the gear 10 from being further rotated beyond the abutment point. The convex portion 10A includes the first pair of convex 10A-1 and the second pair of convex 10A-2, and the abutment projection 12C is interposed between the first and second pair of convexes 10A-1 and 10A-2, the projection 12C can abut the convex portion 10A irrespective of the rotating direction.

Even when the circular saw blade 4 is stopped instantaneously, the gear 10 is urged to be rotated in a state where the spindle 11 and coupling 12 have been stopped. Therefore, the elastic member 14A interposed between the damper projection 12A and the second pair of convex 10A-2 is compressed, to allow the first pair of convex 10A-1 to be brought into abutment with the abutment projection 12C. After the abutment, the gear 10 and coupling 12 are urged to be rotated integrally. At this time, if a reaction force generated upon stopping rotation of the circular saw blade 4 has not been reduced, the reaction force is directly transmitted to the motor 3 through the pinion gear 8 and the gear 10. Therefore, there is a risk of breakage or the like of the motor 3. However, such breakage of the motor 3 is avoidable by the following reason.

As described above, the coupling 12 is only force-fitted with the first shaft section 11A of the spindle 11 and can be rotated relative to the spindle 11 if a shaft torque of more than the predetermined shaft torque (from 30 Nm to 50 Nm) is applied. Not less than 50 Nm of reaction force is applied between the spindle 11 and gear 10 when the rotation of the circular saw blade 4 is suddenly stopped. Accordingly, in this case, slippage occurs between the coupling 12 and the spindle 11. Thus, even when the circular saw blade 4 and spindle 11 stop their rotation, the gear 10 and the coupling 12 are rotated for a given period of time because of the slippage caused between the coupling 12 and the spindle 11, and generate friction force at the force-fitting region. Therefore, energy attendant to the shaft torque can be continuously absorbed by the friction force as long as the shaft torque applied to the gear 10 through the pinion gear 8 is greater than a necessary shaft torque required for providing slipping rotation of the coupling 12 relative to the spindle 11. As a result, even when the circular saw blade 4 is stopped instantaneously, no excessive load is imposed on the motor 3. Further, degradation of the elastic members 14 is avoidable.

In the elastic member 14 according to the first embodiment, portions contacting the damper contact surfaces 10B and 12B are configured into an arcuate shape. Therefore, when no load is applied, a contact area of the elastic member 14 relative to the surfaces 10B, 12B is very small. However, the contact area is increased once load is applied to compress the elastic member 14.

Figure 5:
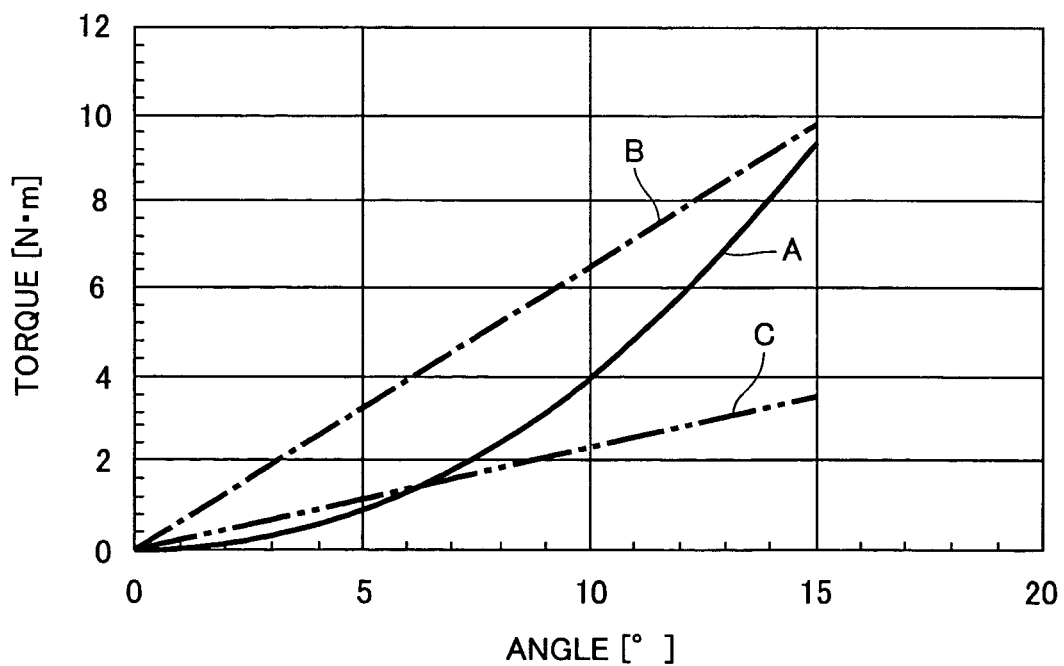
FIG. 5 is a graphical representation showing a characteristic of an elastic member used in the gear unit according to the first embodiment.

The relationship between the rotation angle and the torque is represented in FIG. 5 in which a solid line curve represents a characteristic in a rubber A which is in accordance with the elastic member 14 of the first embodiment. One dotted chain line curve represents a characteristic in a comparative rubber B made from a material the same as that of the rubber A but has a rectangular solid shape so that a planer face is in contact with the damper contact surfaces 10B, 12B. Two dotted chain line curve represents a characteristic in a rubber C having the shape identical with that of the rubber B, but is made from a material having a spring constant lower than that of the rubber A and B.

The relationship between change in angular rotation angle dependent on compression amount of the elastic members, and the shaft torque needed for the change was investigated with respect to these rubbers A, B, and C. The rubber A provided the lowest torque in the small angle range, for example, in the range not more than 6°. However, the shaft torque of the rubber A was rapidly increased as the angle increases. There is substantially no difference between rubber A and B in terms of the shaft torque in the vicinity of the angle of 15°.

It is apparent from the graph that the rubber A can be sufficiently compressed upon application of low shaft torque, and is not excessively compressed upon application of high shaft torque. When being adapted as the elastic member 14, the rubber A sufficiently absorbs impact related to small vibration, and further, the rubber A can also absorb the large impact. That is, the elastic member 14 can effectively prevent the impact in the low torque region generated in the circular saw blade 4 from being transmitted to the gear 10 and pinion 8. Further, the elastic member 14 can effectively absorb the impact force in the high torque region. Thus, resultant circular saw 1 can provide low vibration, low noise and prolonged service life.

Further, the peripheral surface of the elastic member 14 is configured into curved shape. Accordingly, four gaps are provided in the vicinity of the base end and the radially outermost end of the damper projection 12A and the base end and the radially innermost end of the convex portion 10A. That is, four gaps are distributed around each elastic member 14. When the impact is applied to the elastic member 14, the elastic member 14 changes its shape to absorb the impact. If the elastic member 14 is fully filled in the space 10c without gaps around the elastic member 14, the elastic member 14 cannot change its shape, and therefore shock absorbing function may be lowered.

Further, if no gap is provided around the elastic member 14, there is a possibility that a minute part of the elastic member 14 may enter a minute gap between the coupling 12 and the concave portion 10a as a result of compression. That is, the minute part may be thrust between the coupling 12 and the gear 10. In this case, there is a possibility that the coupling 12 and gear 10 are coupled to each other through the minute thrusted portion to impede the movement of the coupling 12 and elastic member 14 within the concave portion 10a to bring about malfunction. Further, there is a possibility that the elastic member 14 is excessively deformed due to the occurrence of the undesired thrusting to shorten the service life of the elastic member 14.

To avoid this problem, the size and shape of the space 10c and the elastic member 14 are designed such that the space 10c is almost filled up in a state where the elastic member 14 is compressed most, that is, when the abutment occurs between the abutment projection 12C and the convex portion 10A. More specifically, the curvature of the elastic member 14 is designed such that the cross-sectional area of the elastic member 14 along a plane perpendicular to the axis of the spindle 11 is equal to a narrowest space surrounded by the concave portion 10a and the coupling 12 when the abutment projection 12C contacts the convex portion 10A. With this configuration, if the elastic member 14 is-compressed at a maximum, the elastic member 14 only fills up the spaces 10c, reducing or avoiding the unwanted thrusting of the elastic member 14 between the concave portion 10a and the coupling 12.

Figure 6:
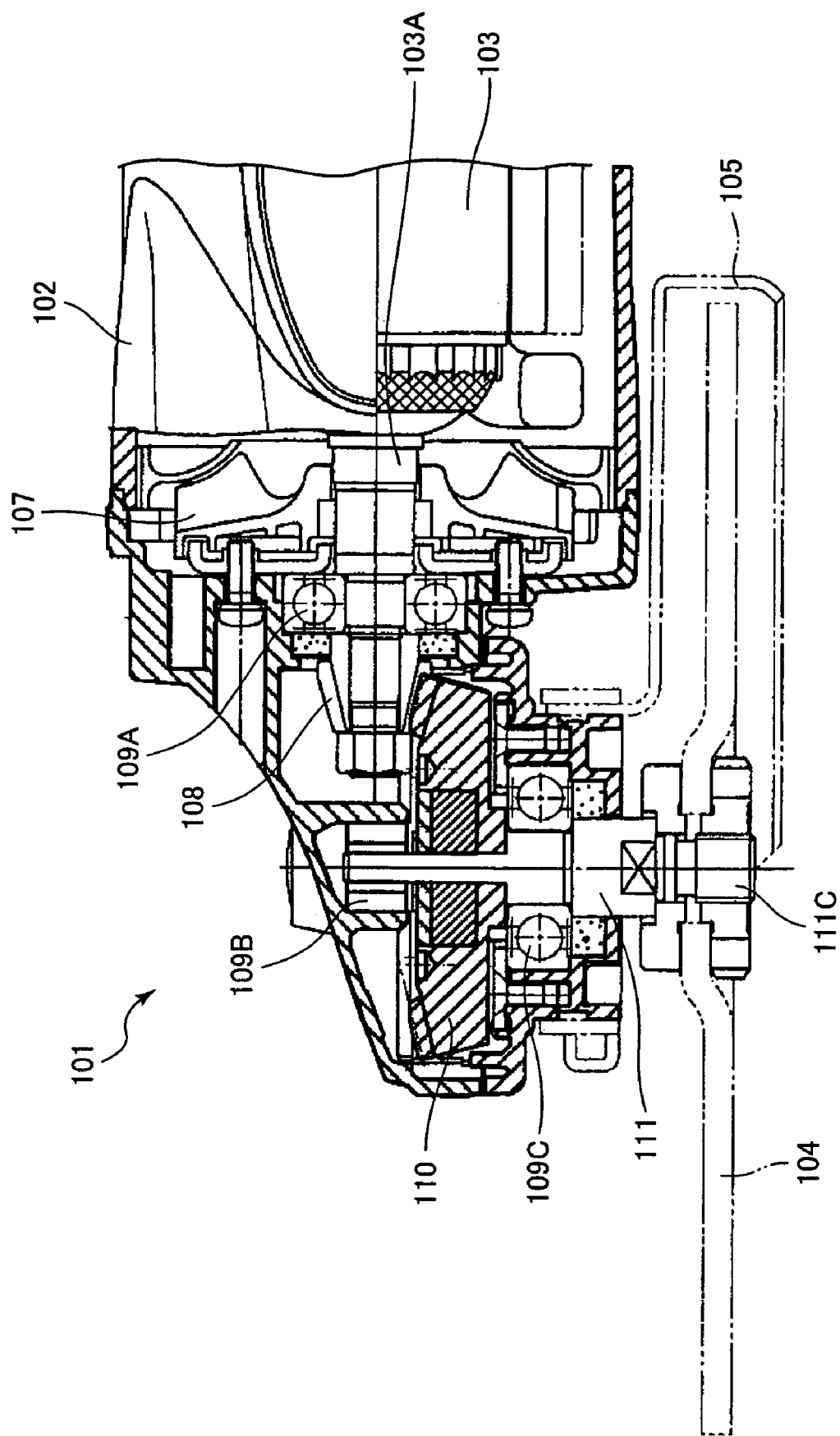
FIG. 6 is a partial cross-sectional view of a disc grinder embodying a power tool according to a second embodiment of the present invention.
Figure 7:
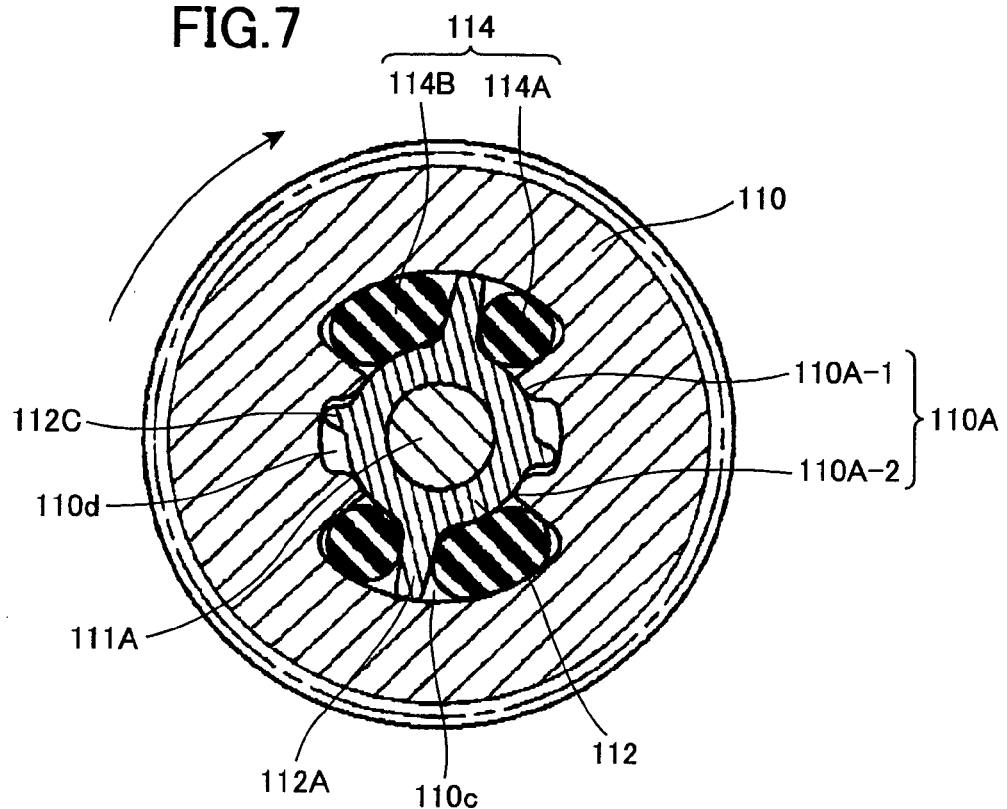
FIG. 7 is a cross-sectional view showing a gear unit used in the power tool according to the second embodiment.

Next, a power tool and a gear unit assembled therein according to a second embodiment of the present invention will be described with reference to FIGS. 6 and 7. The second embodiment pertains to a disk grinder. A disk grinder 101 generally includes a housing 102, a motor 103, a grinding stone 104, a cover 105, and a fan 107. The frame 101 houses and supports the motor 103 having a drive shaft 103A. The grinding stone 104 is drivingly rotated by the motor 103. The housing 102 includes a switch (not shown) for controlling the drive of the motor 103. The grinding stone 104 is fitted to a spindle 111 (to be described later) and is rotatable only in a cutting direction (forward direction). The cover 105 is fitted to the housing 102 and has a shape that covers the upper half of the outer circumference of the grinding stone 104. The fan 107 is fixed to the drive shaft 103A of the motor 103 and generates an air flow to cool the motor 103.

A pinion gear 108, which is a helical bevel gear, is provided at one end of the drive shaft 103A. The drive shaft 103A is rotatably supported to the housing 102 by a first shaft bearing 109A. A spindle 111 extending perpendicular to the drive shaft 103A and serving as a rotary shaft is rotatably supported to the housing 101 through a second shaft bearing 109B and third shaft bearing 109C. The grinding stone 104 is concentrically fixed to the spindle 111. A gear 110, which is a helical bevel gear is disposed concentrically with the spindle 111 at a position opposite to the grinding stone 104. The gear 110 is meshingly engaged with the pinion gear 108. A pair of fixing members 111C are attached to the spindle 111. The fixing members are rotatable integrally with the rotation of the spindle 111. The grinding stone 104 is detachably held between the pair of fixing members 111C.

The inertial mass of the grinding stone 104 fitted to the disk grinder 101 is smaller than that of the circular saw blade 4 fitted to the circular saw 1 according to the first embodiment. Therefore, the impact due to the inertial force of the grinding stone 104 upon rotation is smaller than that in the first embodiment and the load applied to the gear 110 or the like accordingly becomes small. When the switch is turned off after clockwise rotation of the gear 110, a coupling 112 coupled to the grinding stone 104 is urged to be rotated in clockwise direction relative to the gear 110. However, since the inertial mass of the grinding stone 104 is small, the impact can be absorbed in elastic members 114A although the size of the elastic members 114A is small.

In this case, the remaining elastic members 114B can have an increased size. With this arrangement, when the gear 110 is urged to rotate in clockwise direction relative to the coupling 112 due to application of greater load to the grinding stone 104, a greater impact can be sufficiently absorbed in the large elastic members 114B. The slippage between the coupling 112 and spindle 111 or configuration of the gear unit are substantially the same as those in the first embodiment, and therefore, the description will be omitted.

Figure 8:
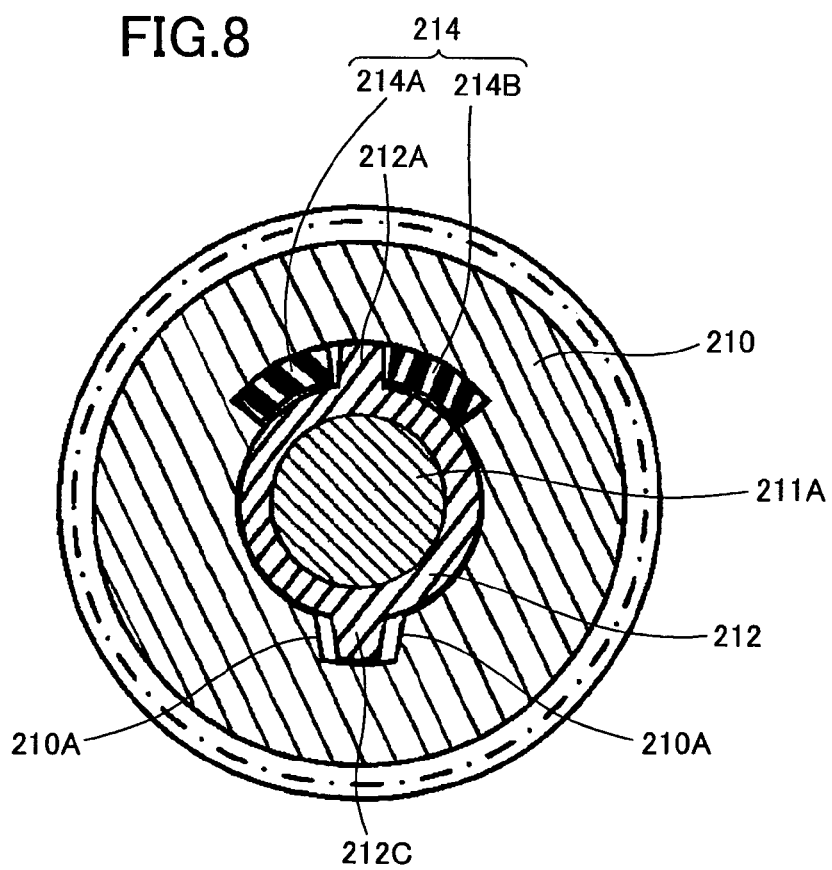
FIG. 8 is a cross-sectional view showing a gear unit according to a third embodiment of the present invention.

A gear unit according to a third embodiment of the present invention is shown in FIGS. 8. The gear unit 200 has a simple structure than those of the first and second embodiments. That is, elastic member 214 includes only one pair of elastic members 214A and 214B. Further, a coupling 212 coupled to a section 211A of the spindle includes a single damper projection 212A and a single abutment projection 212C provided at a diametrically opposite side of the damper projection 212A. Walls 210A correspond to convex portions 10A and 110A in the foregoing embodiments. In the case where the inertial mass of the rotating member such as a circular saw blade and the grinding wheel is small or the number of rotations of the rotating member is small, the level of load applied to the gear unit is small, so that the gear unit 200 can achieve the desired effect even by the reduced numbers of the elastic members.

Figure 9:
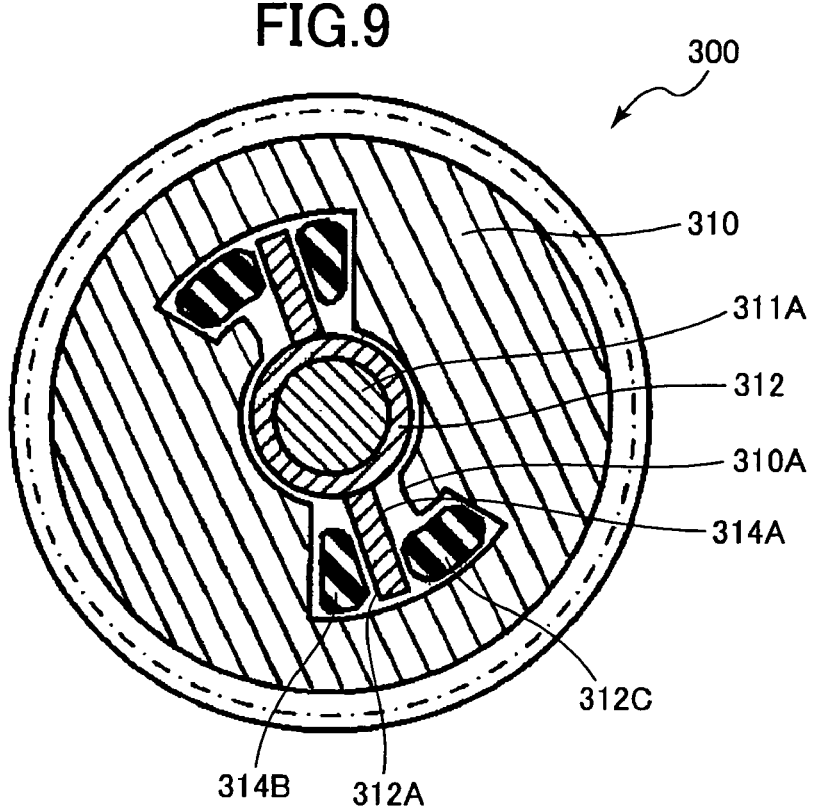
FIG. 9 is a cross-sectional view showing a gear unit according to a fourth embodiment of the present invention.

A gear unit according to a fourth embodiment of the present invention is shown in FIGS. 9. The gear unit 300 includes a coupling 312 provided with a pair of damper projections 312A. The damper projections 312A also serve as abutment projections 312C abuttable on convex portions 310A corresponding to convex portions 10A, 110A and the wall 210A in the foregoing embodiments.

With this arrangement, the structure is simplified and the effect the same as that in the first and second embodiments can be obtained. Further, in the gear unit 300, the convex portion 310A is provided at position abuttable on only one side of the damper projection 312A.

This arrangement is advantageous in that the convex portion 310A is provided for the purpose of receiving greater load applying only in one direction to protect the elastic member 314A and to perform subsequent slippage between a first shaft section 311A and the coupling 312, whereas lesser load applying only in opposite direction is absorbed directly by the elastic member 314B.

Figure 10:
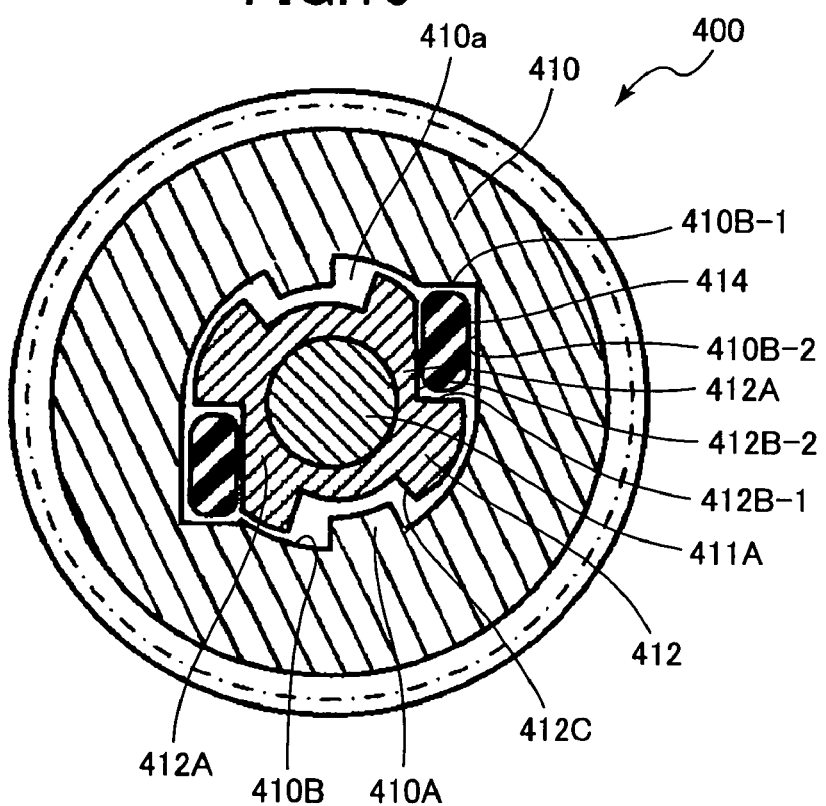
FIG. 10 is a cross-sectional view showing a gear unit according to a fifth embodiment of the present invention.

A gear unit according to a fifth embodiment of the present invention is shown in FIGS. 10. The gear unit 400 includes a gear 410 formed with a concave portion 410a whose contour is defined by a wall 410B. The wall 410B includes a first flat wall 410B-1 and a second flat wall 410B-2 extending perpendicular thereto. A pair of convex 410A extends radially inwardly from the wall 410B. A coupling 412 is force-fitted with a first shaft section 411A of a spindle. The coupling 412 has a pair of radially outward projections 412A each formed with a pair of cut-away portions having a first flat surface 412B-1 and a second flat surface 412B-2 extending perpendicular thereto.

An elongated elastic member 414 is disposed between the first flat surface 412B-1 of the coupling 412 and the first flat wall 410B-1 of the gear 410. The elongated elastic member 414 is also disposed between the second flat surface 412B-2 of the coupling 412 and the second flat wall 410B-2 of the gear 410.

When the coupling 412 is rotated in a counterclockwise direction relative to the gear 410, the elongated elastic member 414 is sandwiched between the first flat surface 412B-1 and the first flat wall 410B-1 to absorb the impact. On the other hand, when the coupling 412 is rotated in a clockwise direction relative to the gear 410, the elongated elastic member 414 is sandwiched between the second flat surface 412B-2 and the second flat wall 410B-2 to absorb the impact. That is, the elongated elastic member 414 is compressed in its longitudinal direction or a direction perpendicular thereto depending on the rotating direction. As a result, plastic deformation of the elastic member 414 due to its compression in only one direction can be avoided.

While the invention has been described in detail and with reference to specific embodiments thereof, it would be apparent to those skilled in the art that various changes and modification may be made therein without departing from the scope of the invention.

Figure 11:
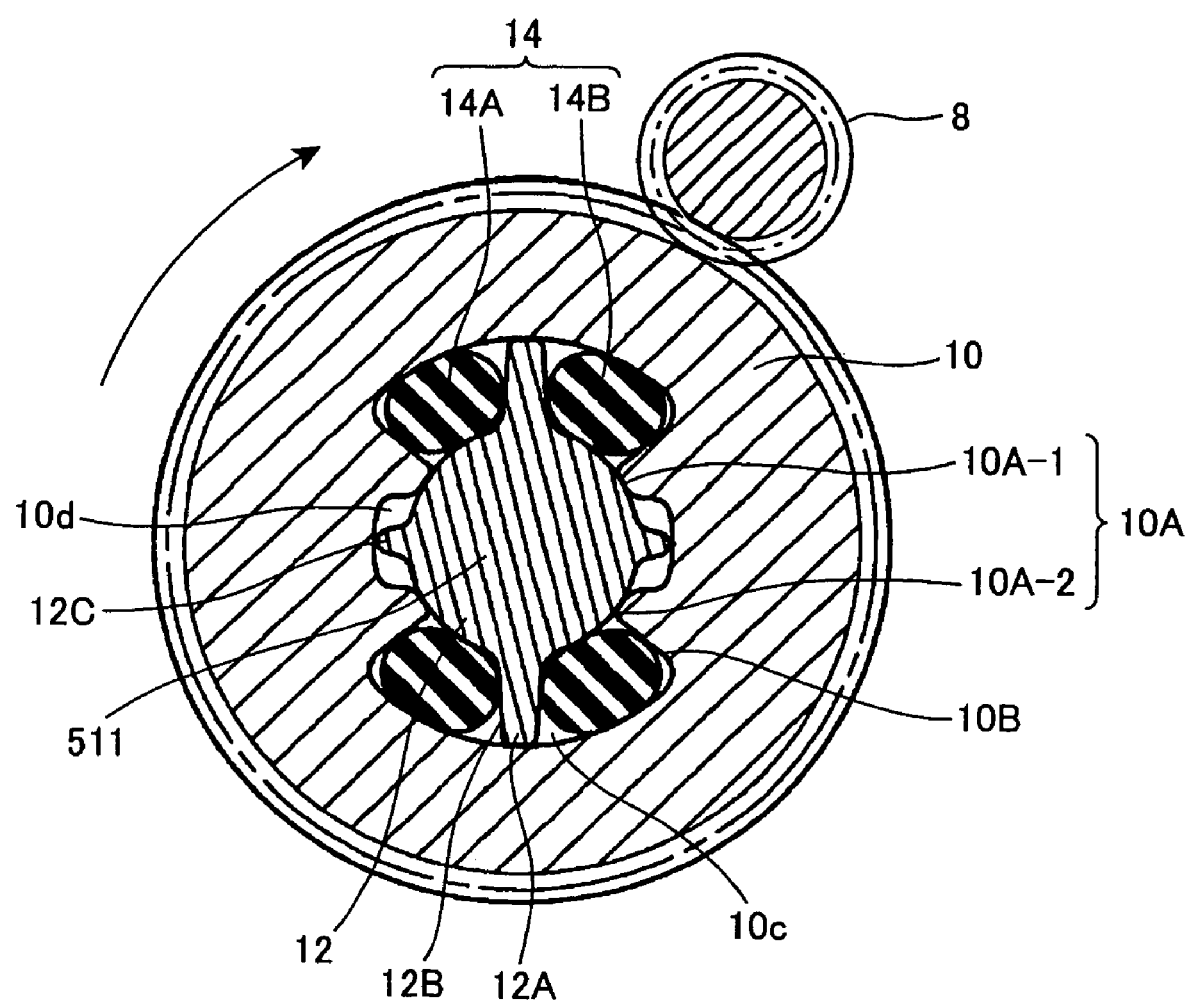
FIG. 11 is a cross-sectional view showing a gear unit according to a modification to the first embodiment.

For example, in the above described embodiments, excessive load is absorbed by the slippage between the coupling serving as an intermediate member and the spindle serving as a rotary shaft. However, a unit for absorbing excessive load can be provided externally from the gear unit. Alternatively, in case where excessive load is not generated, the coupling can be dispensed with, and sections equivalent to the damper projection and abutment projection can be provided directly at a spindle 511 as shown in FIG. 11. In the latter case, the gear has the concave portion formed with convex portion and elastic members having arcuate contour are accommodated in the concave portion like the first embodiment. With this configuration, the impact produced between the rotary shaft and gear can be absorbed by means of the elastic member. Further, in case where the excessive load is applied, the projection and convex portion can prevent the elastic member from being excessively deformed so as to avoid its plastic deformation.

What is claimed is:

1. A power tool comprising:
   a housing;
   a motor disposed in the housing and having a drive shaft;
   a gear unit supported in the housing and driven by the drive shaft; and
   a rotary shaft rotatably supported to the housing and driven through the gear unit, the gear unit comprising:
   an intermediate member force-fitted with the rotary shaft at a predetermined force-fitting pressure, the predetermined force-fitting pressure allowing the rotary shaft and the intermediate member to rotate relative to each other when a load exceeding a predetermined load is applied between the rotary shaft and the intermediate member, the intermediate member having an abutment projection; and
   a gear driven by the drive shaft and disposed concentrically with the rotary shaft so as to rotate in at least one direction about the drive shaft and having a surround portion surrounding the intermediate member and provided with a convex portion, the surround portion being drivingly connected to the intermediate member to rotate the rotary shaft, the abutment projection being abuttable against the convex portion when the rotary shaft and the gear are rotated relative to each other.

2. The power tool as claimed in claim 1, wherein the intermediate member further comprises a damper projection having a damper contact surface which extends transversely to the rotating direction of the gear; and
   wherein the gear unit further comprises an elastic member interposed between the damper projection and the surround portion.

3. The power tool as claimed in claim 2, wherein the intermediate member comprises:
   a sleeve section force fitted with the rotary shaft and having an outer peripheral surface;
   the abutment projection extending from the outer peripheral surface radially outwardly; and
   the damper projection extending from the outer peripheral surface radially outwardly.

4. The power tool as claimed in claim 3, wherein the convex portion comprises a first convex part and a second convex part spaced away from the first convex part in a circumferential direction of the gear, the abutment projection being positioned between the first convex part and the second convex part.

5. The power tool as claimed in claim 2, wherein the elastic member has a plurality of regions in contact with the damper projection and the surrounding portion, each region being configured into arcuate shape.

6. The power tool as claimed in claim 1, wherein the abutment projection has a damper contact surface which extends transversely to the rotating direction of the gear, and
   wherein the gear unit further comprises an elastic member interposed between the abutment projection and the surround portion, the damper contact surface of the abutment projection being contactable with the elastic member.

7. The power tool as claimed in claim 6, wherein the elastic member has an elongated cross-section having a pair of major sides and a pair of minor sides, the abutment projection and the surround portion being configured to compress the elastic member in a direction of the pair of minor sides when the rotary shaft is rotated relative to the gear in a first direction, and to compress the elastic member in a direction of the pair of major sides when the rotary shaft is rotated relative to the gear in a second direction opposite to the first direction.

8. The power tool as claimed in claim 2, wherein the elastic member is compressedly interposed between the intermediate member and the surround portion.

9. A gear unit that transmits rotation of a motor to a rotary shaft comprising:
   an intermediate member force-fitted with the rotary shaft at a predetermined force-filling pressure, the predetermined force-fitting pressure allowing the rotary shaft and the intermediate member to rotate relative to each other when a load exceeding a predetermined load is applied between the rotary shaft and the intermediate member, the intermediate member having an abutment projection; and
   a gear driven by the motor and disposed concentrically with the rotary shaft and having a surround portion surrounding the intermediate member and provided with a convex portion, the surround portion being drivingly connected to the intermediate member to rotate the rotary shaft, the abutment projection being abuttable against the convex portion when the rotary shaft and the intermediate member are rotated relative to each other.

* * * * *